April 9, 1929.  G. S. ELDRED  1,708,834
LIQUID DISPENSER
Filed Aug. 5, 1926  2 Sheets-Sheet 1
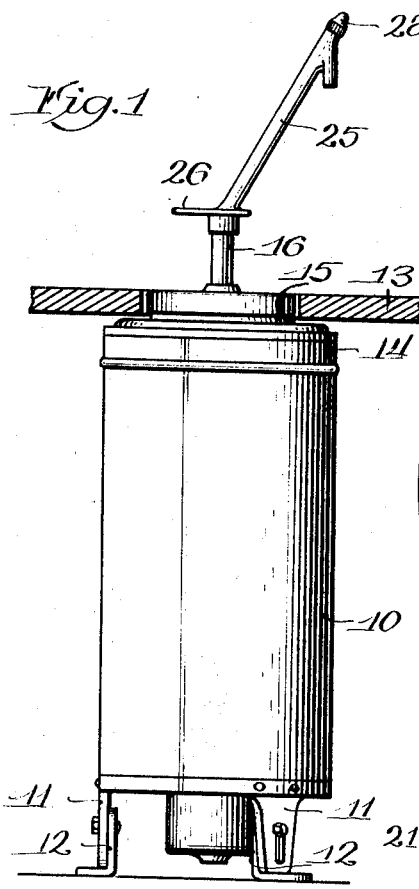
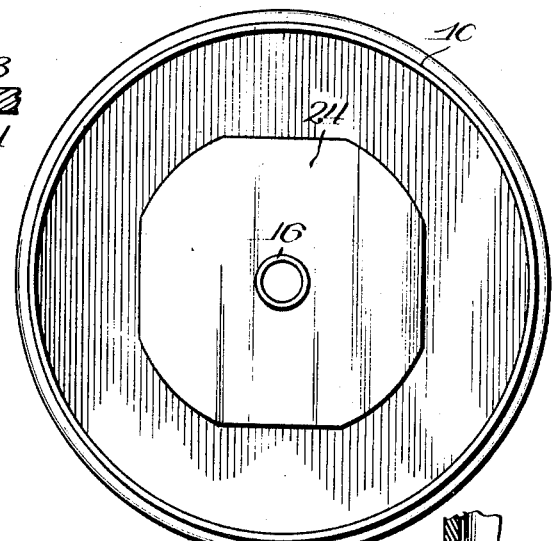
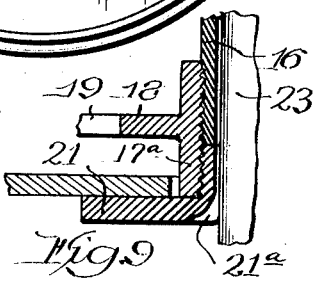
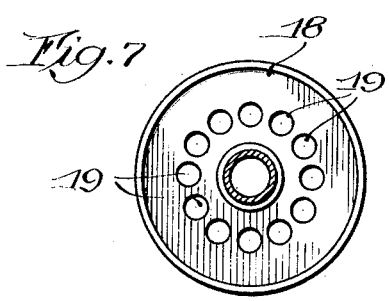
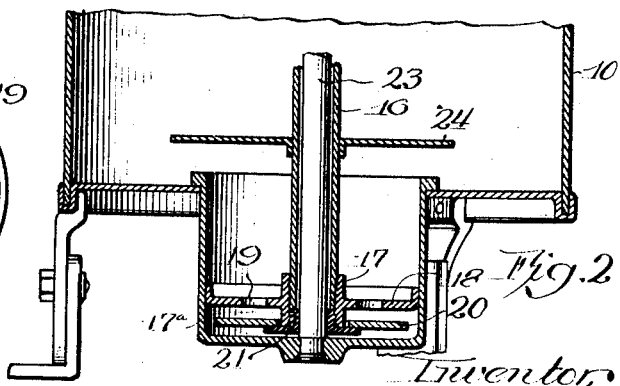
Witness:
Chas. R. Koursh.
Inventor,
George S. Eldred
George Bayard Jones Atty.

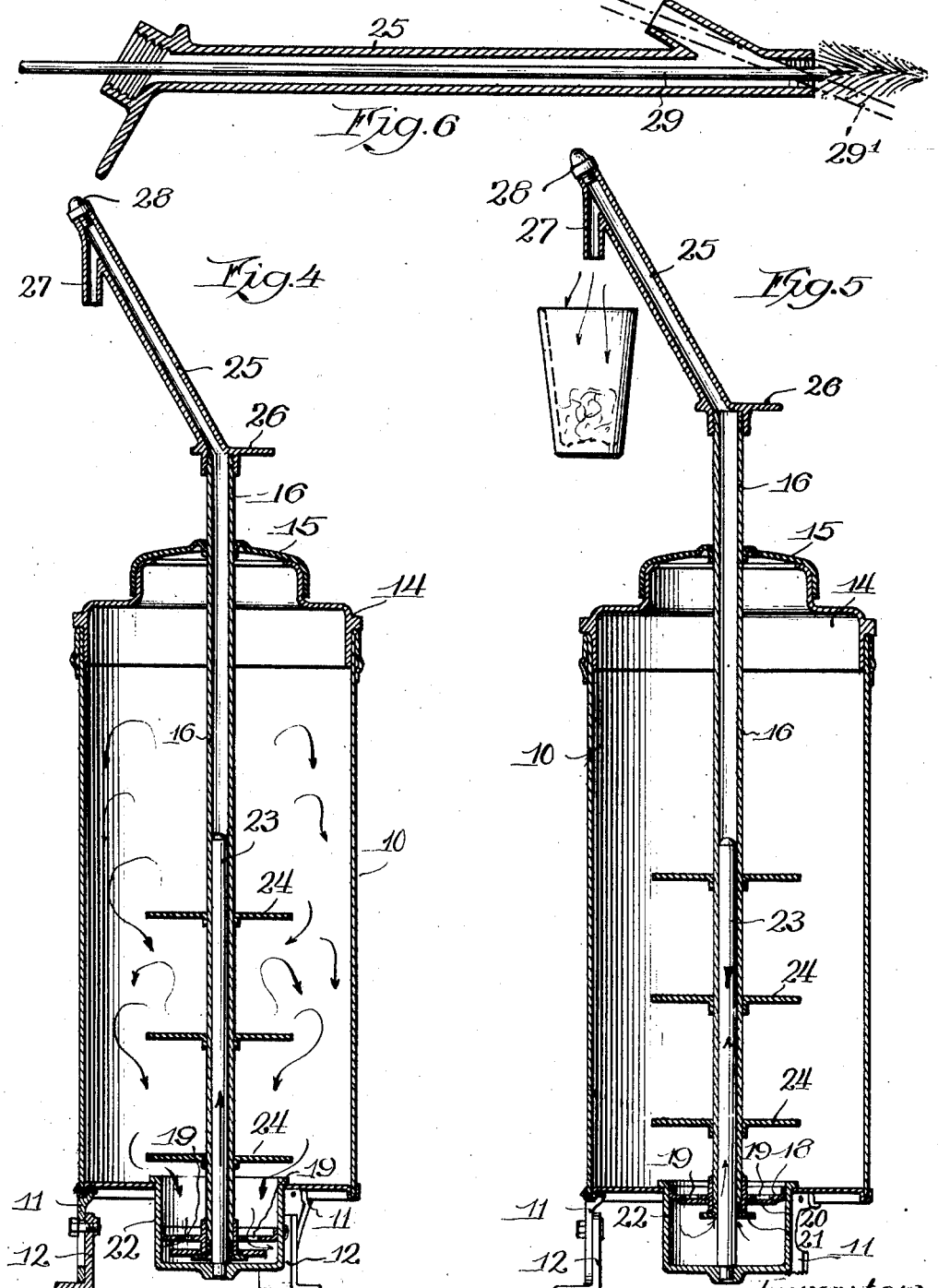

Patented Apr. 9, 1929.

1,708,834

UNITED STATES PATENT OFFICE.

GEORGE S. ELDRED, OF CHICAGO, ILLINOIS, ASSIGNOR TO GEO. S. ELDRED COMPANY, A CORPORATION OF ILLINOIS.

LIQUID DISPENSER.

Application filed August 5, 1926. Serial No. 127,242.

My invention relates to liquid dispensers.

The principal object of the invention is to provide a device adapted to dispense measured quantities of liquid, and which will also agitate the same in such wise that the liquid will be dispensed at substantially a uniform consistency. This feature of the invention is particularly of advantage where milk is the liquid dispensed, as the agitating action of my device thoroughly mixes the cream with the milk so that the butter fat content of each measured quantity dispensed is substantially the same.

Although the present improvements have been made particularly for use in dispensing milk and are described in that relation hereinafter, it will be understood that the invention may be made use of in apparatus for the dispensing of other liquids.

Another object relates to the provision of means whereby the quantity of liquid in the apparatus causes substantially no variation in the quantity dispensed at each operation until the supply of liquid has been practically exhausted.

Another object of the invention is to provide dispensing apparatus which consists of relatively few parts, which parts are readily separable and can be thoroughly cleaned and sterilized with little inconvenience.

A further object resides in providing a combined discharge spout and handle, the spout having an opening closed by a removable plug whereby it can be cleaned readily by a brush, or the like, the handle being so positioned over the plunger of the pump that the same can be operated without binding.

An additional object is to provide adjustable legs whereby the apparatus can be properly adjusted when used in an ice chest, or the like.

A further object is to provide a dispenser comprising a receptacle having a portion co-operating with a plunger to form a pump, and having a cover which will prevent entrance into the receptacle of foreign matter, such as drippings and wash water, when the dispenser is installed at a soda fountain, ice chest, or the like.

Other objects relate to various features of construction and arrangement of parts which will become apparent from a consideration of the following specifications and accompanying drawings, wherein Figure 1 is a side elevation illustrating my improvements.

Fig. 2 is an enlarged broken vertical sectional view of the lower portion thereof.

Fig. 3 is a plan view of a portion of the device shown in Fig. 2.

Fig. 4 is a vertical sectional view showing the valve opened as when the pumping mechanism is initially started upwardly.

Fig. 5 is a similar view showing the valve closed as when the pumping mechanism begins a downward stroke.

Fig. 6 is a longitudinal sectional view of the combined handle and discharge spout.

Fig. 7 is a plan view of the piston.

Fig. 8 is a bottom plan view of the guide nut.

Fig. 9 is a broken vertical sectional view illustrating a portion of the pumping mechanism.

In the drawings, 10 is a suitable receptacle, being provided with a plurality of legs 11 having extensible feet 12 secured thereto whereby the receptacle 10 can be raised or lowered, as desired, within certain limits. This feature is of advantage where the apparatus is used in connection with an ice chest, the cover of which is illustrated in section at 13, in Fig. 1. The receptacle is provided with a cover 14 having a central opening therein over which a lid 15 fits. The feet 12 are preferably so adjusted when the device is used in connection with an ice chest as to bring the top of the lid 15 substantially in the plane of the upper surface of the cover 13 of the chest. The lid 15, as will be seen, can be raised for refilling the receptacle without removing the same from the ice chest and without lifting the cover 13 of the chest.

The lid 15 is provided with a central opening through which extends the tube 16. The lid 15 may be eliminated and the crown or raised portion of the cover 14 may be provided with an opening only large enough to admit the tube 16 when the device is employed at a soda fountain having the usual separately removable wash plates. The receptacle 10 can be refilled by removing the wash plate and the cover 14, but in some instances it is convenient to provide the lid 15 for refilling purposes where the fountain or ice chest is differently constructed.

The lower end of the tube 16 may be threaded, as shown for instance in Figs. 2 and 9, by means of which the said tube is attached to the threaded collar 17 of the plunger or piston 18. After the tube has been screwed into the collar 17, it is preferably soldered or welded thereto to provide a sanitary construction. The piston 18 is provided with a plurality of openings 19 which are adapted to be closed on the downward stroke of the piston by the ring valve member 20, which is centrally apertured and moves freely on the lower extension 17$^a$ of the collar 17. The downward movement of the valve 20 is limited by the flanged guide nut 21 which is threaded for attachment to the said lower extension 17$^a$, as shown in Fig. 2.

The bottom of the receptacle 10 is centrally provided with a well or pump barrel 22, centrally secured in which is the vertically arranged guide rod 23. This rod extends upwardly into the receptacle and terminates at approximately the height at which the receptacle is normally filled with milk. The well 22 forms, in effect, the pump cylinder within which the piston 18 slides when the same is reciprocated by the movement of the tube 16. A plurality of spaced vanes or plates 24 are secured to the tube 16 at points below the normal level of the milk which plates serve as agitators for the milk and keep the same thoroughly mixed so that the milk dispensed by the device has a uniform butter fat content. The pumping mechanism is normally down, so the first movement is up and the milk is agitated before it is drawn. The upper end of the tube 16 has a threaded connection with the lower end of a discharge pipe 25. The lower portion of pipe 25 has a circular horizontal extension, offset from the center line of the pipe and forms a handle 26 for the convenient reciprocation of the pumping mechanism. The handle is located over the tube 16 so the latter can be reciprocated without binding.

The upper end of pipe or spout 25 is provided with a downwardly extending branch or discharge nozzle 27, the opening through the nozzle being at such an angle with reference to the opening in the pipe 25 proper, that said nozzle 27 can be cleaned by a brush, or the like, through the upper end of pipe 25 when the closing plug 28 has been removed. The direction of such cleaning operation from the end of the pipe 25 is indicated by dotted lines 29′ in Fig. 6. The opening through pipe 25 is straight so that the same can be cleaned conveniently by the brush 29, or the like.

When the pumping mechanism, comprising the tube 16, piston 18, ring valve 20 and nut 21, is inserted in the receptacle, the openings through the said members of the pumping mechanism receive the vertical guide rod 23. The diameter of the opening in the tube 16 is just slightly larger than the rod 23 so that if the level of the milk is at the top of the rod 23, the tube will contain no milk except the relatively thin film around the rod. The quantity of milk represented by this film is very small, and, hence, the difference between the film in the tube when the tank is practically full and between the quantity of milk represented by the film when the milk supply is low is likewise very small. In other words, the quantity of milk in the tube 16 is only that forming the film around the rod 23. By means of this arrangement, the apparatus delivers a practically uniform quantity of milk at each pumping stroke. In practice one stroke of the apparatus as at present constructed draws an eight ounce glass of milk, regardless of the amount in the container.

The guide nut 21 is bored to more closely fit the rod 23 than does the tube 16. By means of this relatively close fit of the bore of nut 21 with the rod, the piston 18 is properly centered with reference to the pump barrel 22 and does not become battered in lowering the same into the well, nor interfere with the smooth operation of the apparatus. In order to admit milk through the bore of the nut 21 into the tube 22 when the same are moved downwardly into the pump barrel, I have provided three grooves 21$^a$ in the nut, as shown in Figs. 2, 8 and 9. More grooves of course may be provided, if desired. When it is desired to discharge a measured quantity of milk, the operator lifts the tube 16 upwardly by means of the handle 26 which upward movement causes the ring disk valve 20 to drop away from the lower surface of the piston to the position shown in Figs. 2 and 4. The openings 19 in the piston 18 are thereby uncovered which permits the milk to flow freely to the bottom of the well or pump barrel 22 as the piston 18 moves upwardly. The capacity of the openings 19 is such that the upward movement of the piston causes no drawing of air, dust, etc., through the discharge nozzle 27. It will be seen that the upward movement of the tube 16, carrying with it the agitators 24, causes a mixing and agitation of the milk in the receptacle proper and also in the well 22 so that even after the milk has been allowed to stand for a time the butterfat content of all portions drawn is uniform. Upon the downward movement of the tube 16, the valve 20 is caused to contact with the lower surface of the piston 18, thereby closing the openings 19 and preventing escape of milk from the pump barrel 22, except through the grooves 21$^a$ and upwardly through the tube 16 into spout 25 and through the discharge nozzle 27.

The apparatus is sanitary and has been officially approved by the health department of a large American city. It functions very efficiently and an attendant may carry two or three glasses, such as the one shown in Fig. 5, and by holding them in succession under the discharge nozzle 27 can fill each one by an up and down movement of the tube 16.

It will be understood that nut 21 can readily be removed, whereby the ring valve 20 can be taken off and sterilized and cleaned and provide access to the lower surface of the piston 18. The pumping apparatus can be removed from the receptacle, as will be understood, and the parts thereof being readily separable can be cleaned and sterilized thoroughly with very little inconvenience.

Although I have shown certain features of my improvements for the purpose of illustration, it will be understood that various changes may be made therein without departing from the spirit of the invention and defined in the appended claims.

What I claim as new is:

1. Liquid dispensing apparatus comprising a receptacle, a centrally positioned vertical rod therein, pumping mechanism surrounding said rod and slidable with reference thereto, said pumping mechanism comprising a tube having an inner diameter slightly greater than said rod, piston and valve mechanism carried by said tube, and a retaining nut for said valve mechanism, said nut having an inner diameter closely fitting said rod whereby said nut serves to guide said piston on said rod, said nut having recesses for admitting liquid to said tube during the pumping operation.

2. Liquid dispensing apparatus comprising a receptacle, a centrally positioned vertical rod therein; pumping mechanism slidable on said rod, said mechanism comprising a tube having an inner diameter only slightly greater than said rod, pumping means for forcing liquid from the bottom of said receptacle upwardly through said tube, around said rod, and a nut at the lower end of said tube for guiding the latter and said pumping means on said rod.

3. Pumping apparatus comprising a receptacle, a pump barrel at the bottom thereof, a vertical rod extending upwardly from said barrel, a reciprocable liquid delivery tube slidable on said rod and providing a passage for liquid therebetween, an apertured piston secured to said tube for reciprocation in said barrel during the actuation of said tube, and a valve member for closing the aperture of said piston upon the delivery stroke of said piston whereby liquid from said barrel will be forced upwardly through the passage between said rod and tube.

In testimony whereof, I have subscribed my name.

GEORGE S. ELDRED.